(12) United States Patent
Abdallah et al.

(10) Patent No.: US 9,160,537 B2
(45) Date of Patent: Oct. 13, 2015

(54) METHODS FOR SECURE RESTORATION OF PERSONAL IDENTITY CREDENTIALS INTO ELECTRONIC DEVICES

(71) Applicant: Apple Inc., Cupertino, CA (US)

(72) Inventors: David S. Abdallah, Charlottesville, VA (US); Barry W. Johnson, Charlottesville, VA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/932,642

(22) Filed: Jul. 1, 2013

(65) Prior Publication Data

US 2013/0290726 A1    Oct. 31, 2013

Related U.S. Application Data

(60) Continuation of application No. 13/287,471, filed on Nov. 2, 2011, now Pat. No. 8,478,992, which is a continuation of application No. 12/190,064, filed on Aug. 12, 2008, now Pat. No. 8,055,906, which is a (Continued)

(51) Int. Cl.
*H04L 9/32* (2006.01)
*G06F 21/32* (2013.01)

(52) U.S. Cl.
CPC .............. *H04L 9/3231* (2013.01); *G06F 21/32* (2013.01); *H04L 9/3247* (2013.01); *H04L 9/3263* (2013.01)

(58) Field of Classification Search
CPC . H04L 9/3231; H04L 63/0861; H04L 9/3247; H04L 9/3263; G06F 21/32

USPC .................. 713/176, 186; 382/115; 340/5.8
See application file for complete search history.

(56) References Cited

U.S. PATENT DOCUMENTS 4,993,068 A    2/1991    Piosenka et al.
5,053,608 A    10/1991    Senanayake
(Continued)

FOREIGN PATENT DOCUMENTS

WO    WO 99/08238    2/1999
WO    WO 00/65770    11/2000
(Continued)

OTHER PUBLICATIONS

International Search Report for PCT/US2003/024472 dated Nov. 20, 2003, 2 pages.

(Continued)

*Primary Examiner* — Techane Gergiso
(74) *Attorney, Agent, or Firm* — Blakely, Sokoloff, Taylor & Zafman LLP

(57) ABSTRACT

A method and system for securely enrolling personal identity credentials into personal identification devices. The system of the invention comprises the manufacturer of the device and an enrollment authority. The manufacturer is responsible for recording serial numbers or another unique identifier for each device that it produces, along with a self-generated public key for each device. The enrollment authority is recognized by the manufacturer or another suitable institution as capable of validating an individual before enrolling him into the device. The enrollment authority maintains and operates the appropriate equipment for enrollment, and provides its approval of the enrollment. The methods described herein discuss post-manufacturing, enrollment, backup, and recovery processes for the device.

23 Claims, 5 Drawing Sheets

Related U.S. Application Data division of application No. 10/635,762, filed on Aug. 6, 2003, now Pat. No. 7,590,861.

(60) Provisional application No. 60/401,399, filed on Aug. 6, 2002.

(56) References Cited

U.S. PATENT DOCUMENTS

| | | | |
|---|---|---|---|
| 5,131,038 | A | 7/1992 | Puhl et al. |
| 5,280,527 | A | 1/1994 | Gullman et al. |
| 5,469,506 | A | 11/1995 | Berson et al. |
| 5,473,692 | A | 12/1995 | Davis |
| 5,481,265 | A | 1/1996 | Russell |
| 5,526,428 | A | 6/1996 | Arnold |
| 5,591,949 | A | 1/1997 | Bernstein |
| 5,613,012 | A | 3/1997 | Hoffman et al. |
| 5,615,277 | A | 3/1997 | Hoffman |
| 5,659,616 | A | 8/1997 | Sudia |
| 5,729,220 | A | 3/1998 | Russell |
| 5,784,463 | A | 7/1998 | Chen et al. |
| 5,805,719 | A | 9/1998 | Pare, Jr. et al. |
| 5,838,812 | A | 11/1998 | Pare, Jr. et al. |
| 5,870,723 | A | 2/1999 | Pare, Jr. et al. |
| 5,872,848 | A | 2/1999 | Romney et al. |
| 5,920,640 | A | 7/1999 | Salatino et al. |
| 5,930,804 | A | 7/1999 | Yu et al. |
| 5,952,641 | A | 9/1999 | Korshun |
| 5,991,408 | A | 11/1999 | Pearson et al. |
| 6,038,666 | A | 3/2000 | Hsu et al. |
| 6,041,410 | A | 3/2000 | Hsu et al. |
| 1,076,116 | A | 6/2000 | Borza |
| 6,084,968 | A * | 7/2000 | Kennedy et al. ............... 380/259 |
| 6,154,879 | A | 11/2000 | Pare, Jr. et al. |
| 6,167,517 | A | 12/2000 | Gilchrist et al. |
| 6,181,803 | B1 | 1/2001 | Davis |
| 6,182,221 | B1 | 1/2001 | Hsu et al. |
| 6,185,316 | B1 | 2/2001 | Buffam |
| 6,201,484 | B1 | 3/2001 | Russell |
| 6,202,151 | B1 | 3/2001 | Musgrave et al. |
| 6,219,793 | B1 | 4/2001 | Li et al. |
| 6,256,737 | B1 | 7/2001 | Bianco et al. |
| 6,268,788 | B1 | 7/2001 | Gray |
| 6,282,649 | B1 | 8/2001 | Lambert et al. |
| 6,310,966 | B1 | 10/2001 | Dulude et al. |
| 6,317,834 | B1 | 11/2001 | Gennaro et al. |
| 6,353,889 | B1 | 3/2002 | Hollingshead |
| 6,366,682 | B1 | 4/2002 | Hoffman et al. |
| 6,367,013 | B1 * | 4/2002 | Bisbee et al. ............... 713/178 |
| 6,367,017 | B1 | 4/2002 | Gray |
| 6,397,198 | B1 | 5/2002 | Hoffman et al. |
| 6,446,210 | B1 | 9/2002 | Borza |
| 6,466,781 | B1 | 10/2002 | Bromba et al. |
| 6,484,260 | B1 | 11/2002 | Scott et al. |
| 6,487,662 | B1 | 11/2002 | Kharon et al. |
| 6,490,680 | B1 | 12/2002 | Scheidt et al. |
| 6,505,193 | B1 | 1/2003 | Musgrave et al. |
| 6,529,885 | B1 | 3/2003 | Johnson |
| 6,532,298 | B1 | 3/2003 | Cambier et al. |
| 6,581,161 | B1 | 6/2003 | Byford |
| 6,601,172 | B1 | 7/2003 | Epstein |
| 6,609,198 | B1 | 8/2003 | Wood et al. |
| 6,615,264 | B1 | 9/2003 | Stoltz et al. |
| 6,618,806 | B1 | 9/2003 | Brown et al. |
| 6,636,973 | B1 | 10/2003 | Novoa et al. |
| 6,657,538 | B1 | 12/2003 | Ritter |
| 6,662,166 | B2 | 12/2003 | Pare, Jr. et al. |
| 6,668,332 | B1 | 12/2003 | McNeil |
| 6,671,808 | B1 | 12/2003 | Abbott et al. |
| 6,681,034 | B1 | 1/2004 | Russo |
| 6,719,200 | B1 | 4/2004 | Wiebe |
| 6,728,881 | B1 | 4/2004 | Karamchetty |
| 6,735,695 | B1 | 5/2004 | Gopalakrishnan et al. |
| 6,751,734 | B1 | 6/2004 | Uchida |
| 6,757,411 | B2 | 6/2004 | Chau |
| 6,765,470 | B2 | 7/2004 | Shinzaki |
| 6,766,040 | B1 | 7/2004 | Catalano et al. |
| 6,775,776 | B1 | 8/2004 | Vogt et al. |
| 6,786,397 | B2 | 9/2004 | Silverbrook et al. |
| 6,816,970 | B2 * | 11/2004 | Morgan et al. ............... 713/183 |
| 6,819,219 | B1 | 11/2004 | Bolle et al. |
| 6,820,202 | B1 | 11/2004 | Wheeler et al. |
| 6,829,711 | B1 | 12/2004 | Kwok et al. |
| 6,832,317 | B1 | 12/2004 | Strongin et al. |
| 6,836,765 | B1 | 12/2004 | Sussman |
| 6,836,843 | B2 | 12/2004 | Seroussi et al. |
| 6,839,688 | B2 | 1/2005 | Drummond et al. |
| 6,844,660 | B2 | 1/2005 | Scott |
| 6,848,052 | B2 | 1/2005 | Hamid et al. |
| 6,850,147 | B2 | 2/2005 | Prokoski et al. |
| 6,850,252 | B1 | 2/2005 | Hoffberg |
| 6,853,739 | B2 | 2/2005 | Kyle |
| 6,853,988 | B1 | 2/2005 | Dickinson et al. |
| 6,857,073 | B2 | 2/2005 | French et al. |
| 6,862,443 | B2 | 3/2005 | Witte |
| 6,870,946 | B1 | 3/2005 | Teng et al. |
| 6,870,966 | B1 | 3/2005 | Silverbrook et al. |
| 6,871,193 | B1 | 3/2005 | Campbell et al. |
| 6,871,287 | B1 | 3/2005 | Ellingson |
| 6,871,784 | B2 | 3/2005 | Jayaratne |
| 6,876,757 | B2 | 4/2005 | Yau et al. |
| 6,877,097 | B2 | 4/2005 | Hamid et al. |
| 6,879,243 | B1 | 4/2005 | Booth et al. |
| 6,879,966 | B1 | 4/2005 | Lapsley et al. |
| 6,880,749 | B1 | 4/2005 | Green et al. |
| 6,880,750 | B2 | 4/2005 | Pentel |
| 6,883,709 | B2 | 4/2005 | Joseph |
| 6,886,096 | B2 | 4/2005 | Appenzeller et al. |
| 6,886,101 | B2 | 4/2005 | Glazer et al. |
| 6,886,104 | B1 | 4/2005 | McClurg et al. |
| 6,888,445 | B2 | 5/2005 | Gotfried et al. |
| 6,898,577 | B1 | 5/2005 | Johnson |
| 6,901,154 | B2 | 5/2005 | Dunn |
| 6,901,155 | B2 | 5/2005 | Xia et al. |
| 6,901,266 | B2 | 5/2005 | Henderson |
| 6,901,382 | B1 | 5/2005 | Richards et al. |
| 6,914,517 | B2 | 7/2005 | Kinsella |
| 6,957,185 | B1 | 10/2005 | Labaton |
| 6,957,337 | B1 | 10/2005 | Chainer et al. |
| 6,963,659 | B2 | 11/2005 | Tumey et al. |
| 6,985,502 | B2 | 1/2006 | Bunton |
| 6,990,444 | B2 | 1/2006 | Hind et al. |
| 7,024,562 | B1 | 4/2006 | Flink et al. |
| 7,028,191 | B2 | 4/2006 | Michener et al. |
| 7,035,442 | B2 | 4/2006 | Ha et al. |
| 7,069,444 | B2 | 6/2006 | Lowensohn et al. |
| 7,111,173 | B1 | 9/2006 | Scheidt |
| 7,287,158 | B2 * | 10/2007 | Futamura et al. ............... 713/156 |
| 7,305,562 | B1 * | 12/2007 | Bianco et al. ............... 713/186 |
| 7,310,734 | B2 | 12/2007 | Boate et al. |
| 7,590,861 | B2 | 9/2009 | Abdallah et al. |
| 7,613,659 | B1 | 11/2009 | Hoffman et al. |
| 7,788,501 | B2 | 8/2010 | Abdallah et al. |
| 8,001,372 | B2 | 8/2011 | Abdallah et al. |
| 8,055,906 | B2 | 11/2011 | Abdallah et al. |
| 8,127,143 | B2 | 2/2012 | Abdallah et al. |
| 8,407,480 | B2 | 3/2013 | Abdallah et al. |
| 8,478,992 | B2 | 7/2013 | Abdallah et al. |
| 2001/0001876 | A1 | 5/2001 | Morgan et al. |
| 2001/0034836 | A1 | 10/2001 | Matsumoto |
| 2002/0003892 | A1 | 1/2002 | Iwanaga |
| 2002/0018585 | A1 | 2/2002 | Kim |
| 2002/0023217 | A1 | 2/2002 | Wheeler et al. |
| 2002/0026427 | A1 | 2/2002 | Kon et al. |
| 2002/0031230 | A1 | 3/2002 | Sweet et al. |
| 2002/0034319 | A1 | 3/2002 | Tumey et al. |
| 2002/0056043 | A1 | 5/2002 | Glass |
| 2002/0087857 | A1 | 7/2002 | Tsao et al. |
| 2002/0095586 | A1 | 7/2002 | Dulude et al. |
| 2002/0104006 | A1 * | 8/2002 | Boate et al. ............... 713/186 |
| 2002/0104025 | A1 | 8/2002 | Wrench, Jr. |
| 2002/0129236 | A1 | 9/2002 | Nuutinen |
| 2002/0129251 | A1 | 9/2002 | Itakura et al. |
| 2002/0133716 | A1 | 9/2002 | Harif |
| 2002/0174344 | A1 | 11/2002 | Ting |

(56) References Cited

U.S. PATENT DOCUMENTS

| | | |
|---|---|---|
| 2002/0186838 A1 | 12/2002 | Brandys |
| 2003/0005310 A1* | 1/2003 | Shinzaki ............... 713/186 |
| 2003/0089764 A1* | 5/2003 | Meadow et al. ............ 235/375 |
| 2003/0101349 A1 | 5/2003 | Wang |
| 2003/0115475 A1* | 6/2003 | Russo et al. ............... 713/186 |
| 2003/0115490 A1 | 6/2003 | Russo et al. |
| 2003/0200257 A1 | 10/2003 | Milgramm et al. |
| 2003/0233556 A1 | 12/2003 | Angelo et al. |
| 2004/0015958 A1 | 1/2004 | Veil et al. |
| 2004/0044627 A1 | 3/2004 | Russell et al. |
| 2013/0227299 A1 | 8/2013 | Abdallah et al. |

FOREIGN PATENT DOCUMENTS

| | | |
|---|---|---|
| WO | WO 01/92994 A2 | 12/2001 |
| WO | WO 2004/014017 A1 | 2/2004 |

OTHER PUBLICATIONS

Office Action for Canadian Patent Application No. 2,494,299, mailed Jul. 31, 2008, 3 pages.

Office Action for Canadian Patent Application No. 2,494,299, mailed Jul. 7, 2010, 3 pages.

Office Action for Canadian Patent Application No. 2,494,299, mailed Oct. 13, 2011, 2 pages.

European Search Report for European Patent Application No. 03767206.0, mailed Jul. 4, 2011, 3 pages.

English translation of Office Action for Japanese Patent Application No. 2004-526454, mailed Jul. 14, 2009, 5 pages.

English translation of Office Action for Japanese Patent Application No. 2004-526454, mailed Apr. 13, 2010, 3 pages.

Office Action for U.S. Appl. No. 10/635,762, mailed on Jul. 11, 2007, 10 pages.

Office Action for U.S. Appl. No. 10/635,762, mailed on Jan. 8, 2008, 18 pages.

Office Action for U.S. Appl. No. 10/635,762, mailed on Aug. 20, 2008, 19 pages.

Office Action for U.S. Appl. No. 12/190,058, mailed on Sep. 2, 2009, 5 pages.

Office Action for U.S. Appl. No. 12/190,058, mailed on Apr. 27, 2010, 16 pages.

Office Action for U.S. Appl. No. 12/190,058, mailed on Sep. 14, 2010, 17 pages.

Final Office Action for U.S. Appl. No. 12/190,058, mailed on Mar. 31, 2011, 16 pages.

Office Action for U.S. Appl. No. 12/190,061, mailed on Sep. 1, 2009, 5 pages.

Office Action for U.S. Appl. No. 12/190,064, mailed on Sep. 2, 2009, 5 pages.

Final Office Action for U.S. Appl. No. 12/190,064, mailed on Aug. 17, 2010, 10 pages.

Office Action for U.S. Appl. No. 12/560,254, mailed on Sep. 17, 2010, 12 pages.

Office Action for U.S. Appl. No. 13/210,022, mailed on May 10, 2012, 16 pages.

Office Action for U.S. Appl. No. 13/287,471, mailed on May 9, 2012, 5 pages.

Schneier, Bruce, "Applied Cryptography: Protocols, Algorithms, and Source Code in C," Second Edition, 1996, John Wiley & Sons, Inc., pp. 31-34.

Fumiko Komatsu, PKI Handbook, Japan, Soft Research Center Inc., Nov. 25, 2000, pp. 105-108.

Isobe, Y. et al., "Development of personal authentication system using fingerprint with digital signature technologies," Proceedings of the 34th Hawaii International Conference on System Sciences, Jan. 3, 2001, pp. 4039-4047.

Davida, G. et al., "On enabling secure applications through off-line biometric identification," Security and Privacy, May 3, 1998. Proceedings of the 1998 IEEE Symposium, pp. 148-157.

* cited by examiner

METHODS FOR SECURE RESTORATION OF PERSONAL IDENTITY CREDENTIALS INTO ELECTRONIC DEVICES

RELATED U.S. APPLICATION DATA

This application is a continuation of U.S. patent application Ser. No. 13/287,471, filed on Nov. 2, 2011, entitled "Methods for Secure Restoration of Personal Identity Credentials into Electronic Devices;" which is a continuation of U.S. patent application Ser. No. 12/190,064, filed Aug. 12, 2008, entitled "Methods for Secure Restoration of Personal Identity Credentials into Electronic Devices", now U.S. Pat. No. 8,055,906; which is a divisional of U.S. patent application Ser. No. 10/635,762, filed Aug. 6, 2003, entitled "Methods for Secure Enrollment and Backup of Personal Identity Credentials into Electronic Devices," now U.S. Pat. No. 7,590,861; which claims priority to U.S. Patent Application No. 60/401,399 filed on Aug. 6, 2002 entitled, "A Secure Enrollment Process for a Biometric Personal Authentication Device;" each of which is herein incorporated by reference in their entireties.

This application is related to U.S. patent application Ser. No. 12/190,058, filed Aug. 12, 2008, entitled "Methods for Secure Enrollment of Personal Identity Credentials into Electronic Devices" now U.S. Pat. No. 8,127,143; and U.S. patent application Ser. No. 12/190,061, filed Aug. 12, 2008, entitled "Methods for Secure Backup of Personal Identity Credentials for Electronic Devices," now U.S. Pat. No. 7,788,501; each of which is incorporated herein by reference in their entireties.

BACKGROUND OF THE INVENTION

1. Field of the Invention

This invention relates generally to the field of information security, and more particularly to an enrollment process for devices capable of storing and releasing personal identity credentials based on authentication of a human fingerprint.

2. Necessity of the Invention

Devices and applications that use biometric authentication are increasing in popularity and frequency of use in applications where information security and privacy is critical. The success rates of devices that use biometrics as a form of authorization are dependent on the accuracy of the process by which information is associated with the biometric; for example, it must not be possible for John Doe to intercept Jane Doe's enrollment process and enroll Jane Doe's credentials into a device with his fingerprint. A generalized enrollment process includes capturing a biometric sample, ensuring the legitimacy of the sample and the individual providing the sample, storing the biometric sample in the appropriate location in the device, and enabling access rights to the enrolled individual. If this enrollment process is performed incorrectly or ineffectively then the process of biometric authentication and the implicit guarantee of enhanced security are easily defeated.

A variety of portable electronic devices with biometric authentication are available to consumers. These include Hewlett Packard's iPAQ Pocket PC h5450, 3M-AiT's VeriMe, Privaris' BPID™ Security Device, and Sony's FIU-900 Puppy®. Each device is capable of storing fingerprints and performing on-board matching. Several of these products are configurable to allow use of cryptographic keys after proof of biometric identification. As discussed in the following section, ownership of cryptographic keys is typically used as a form of remote identification when individuals are communicating digitally. It is imperative, then, that the fingerprint is definitively linked to an individual, so that the cryptographic keys cannot be misused.

Furthermore, because the enrollment process must necessarily be stringent, and likely time-consuming, it is desirable to have a simple method of archiving and restoring enrolled credentials and fingerprints. Clearly the method must be inherently secure, because the entire enrollment process could be overridden by a compromise of the backup process.

DESCRIPTION OF THE RELATED ART

Public Key Infrastructure

The public key infrastructure (PKI) and digital certificates are very common and, when used correctly, can be used to guarantee a 'cryptographic identity' of an individual. The most common form of the PKI uses the RSA algorithm, which is now freely available to the public.

To use the PKI, an individual—Alice—applies for a digital certificate from a trusted authority. After a substantive background investigatory process, the trusted authority decides that Alice is who she claims to be and decides to issue a digital certificate. The certificate includes a public key, one half of an asymmetric key pair, which is assigned only to Alice. She retains the other half of the key pair, the private key. Due to the fundamental principles of public key cryptography, anything encrypted by the Alice's private key can only be decrypted using her public key, and vice versa. Alice is free to distribute the digital certificate and the public key to whomever she wishes.

When another individual, Bob, wishes to send a message to Alice, he encrypts it with her public key. Alice receives the encrypted message and uses her private key to decrypt it. Because Alice is the unique owner of her public key, Bob knows that she possesses the unique and accompanying private key. Additionally, Bob sees that a trusted authority, which he knows performs substantive background checks, issued the digital certificate issued to Alice. He is assured that the only person who can read the message is truly Alice. This assures one-way security.

However, Alice cannot be sure that Bob sent her the message, because her public key is freely accessible. To combat this problem, Bob also requests and receives a digital certificate from a trusted authority. Bob writes his message and then creates a digital signature for the message. He first creates a hash of the message; this process creates a fixed-length string that is unique to the message but cannot be used to deduce the message. He then encrypts this hash using his private key and appends the encrypted hash to his message. The message and encrypted hash are now encrypted with Alice's public key, and transmitted to her.

Alice first decrypts the message with her private key. She can now read the message, as described above. However, she also has the encrypted hash, which she can use to verify that Bob sent the message. She uses Bob's public key to decrypt the digital signature and obtain the hash. Alice then hashes the received message herself, using the same hash algorithm as Bob. If she obtains the same hash value as the one transmitted by Bob, she is assured that the message has not changed, and that he did actually send the message.

Enrollment Processes

3M-AiT's VeriMe stores a biometric template and a cryptographic private key for one user. When the user wishes to use the cryptographic private key, he or she must supply the correct biometric template. According to the VeriMe fact sheet, the private key is generated at the time of "secure registration" of the fingerprint. However, the fact sheet does not describe the secure registration or what it entails; it also does not discuss a secure backup and recovery process.

Biometric Associates (BAI) produces a fingerprint sensor that can be embedded into a smartcard. The smartcard can then be used to perform local biometric authentication, like the devices described above. According to BAI's website, the cards can enroll up to eight users with the use of a BAI Enrollment Station. The Enrollment Station provides external equipment necessary to instruct the smartcard to start enrolling fingerprints and personal credentials. However, the published information does not describe a secure cryptographic process for accomplishing this. It also does not describe secure backup and recovery processes.

BRIEF SUMMARY OF THE INVENTION

The invention disclosed herein describes processes for securely enrolling personal identity credentials into devices with means for personal identification. For example, a handheld computer with a biometric sensor may use enrolled fingerprints to identify a user when he requests access to stored information. The enrollment of the fingerprint must tie the user definitively to the fingerprint so that future authorizations are valid.

The invention described herein provides a process for enrollment wherein a manufacturer of a personal identification device records serial numbers or another unique identifier for each device that it produces, along with a self-generated public key for each device. An enrollment authority is recognized by the manufacturer or another suitable institution as capable of validating an individual before enrolling him into the device-maintains and operates the appropriate equipment for enrollment, and provides its approval of the enrollment. In some embodiments, a biometric personal identification device (BPID) is verified that it is a legitimate device and that it has not been previously enrolled to another individual.

The BPID is an electronic, secure personal identification apparatus for which the present invention describes enrollment techniques. The security features that it offers, including integration with the public key infrastructure and local-only storage of the biometric, guarantee that the processor has authorized the dissemination of personal information.

The methods described herein are directed to post-manufacturing processes for the device, as well as the enrollment itself. Additionally, the invention describes methods for securely archiving enrolled personal identity credentials. This is to allow users to restore previously validated credentials into a new device without requiring a completely new enrollment. Correspondingly, the invention describes the restoration process, in which the stored credentials are securely downloaded into the new device.

415 Verify the digital signature using the primary device's public key

416 Store the personal identity credential in the secondary device

Figure 1:
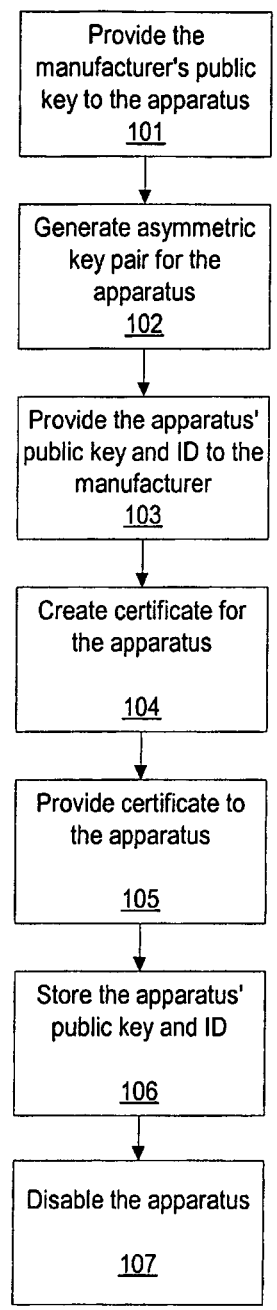
FIG. 1: Post-manufacturing process
101 Provide manufacturer's public key to device
102 Generate key pair for device
103 Provide device's public key and unique ID to manufacturer
104 Create digital certificate for device
105 Provide digital certificate to device
106 Store device's public key and unique ID
107 Disable device

FIG. 1 is a flow chart illustrating the post-manufacturing process for a personal identification device.

Figure 2:
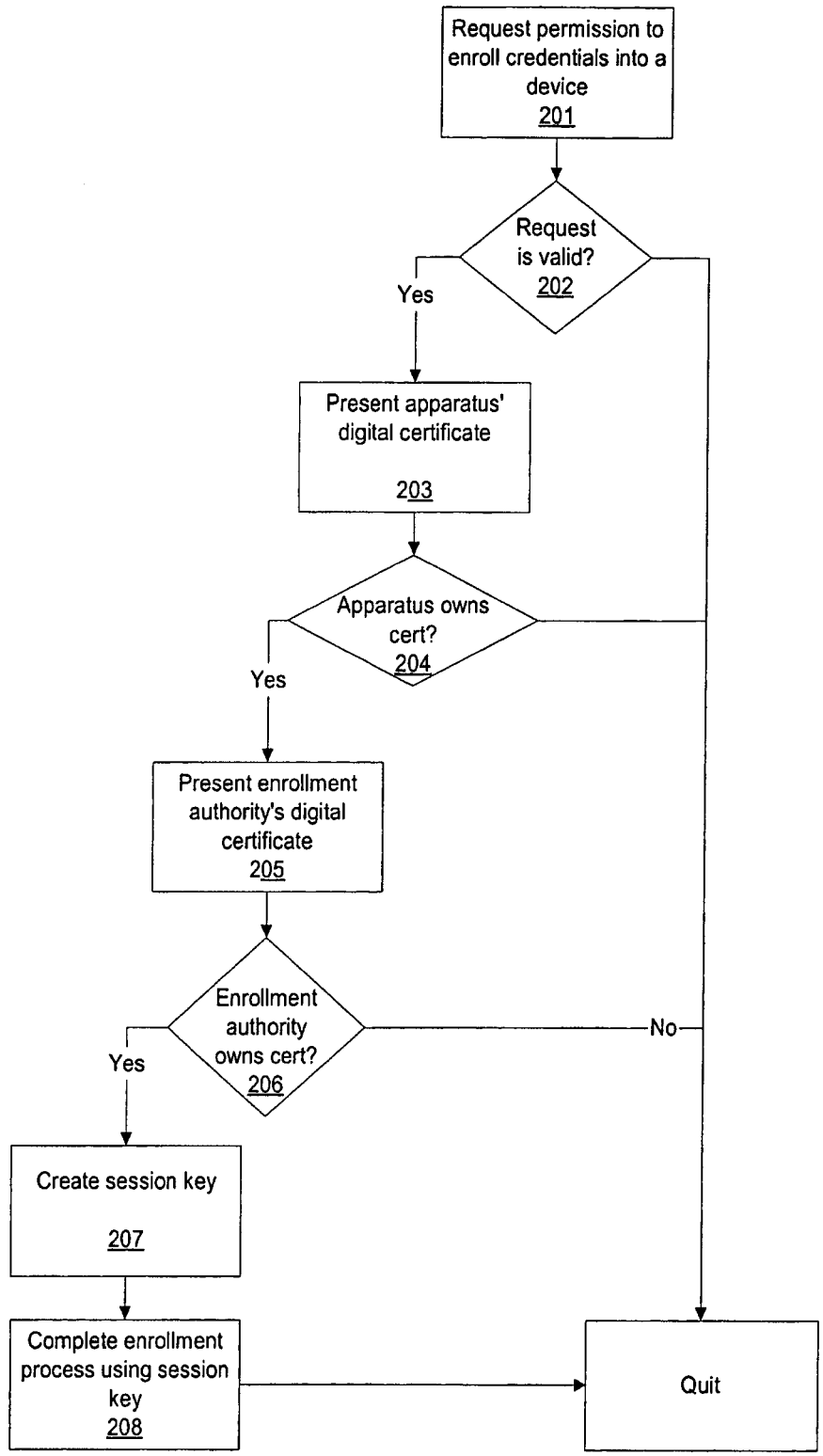
FIG. 2: Enrollment
201 Request permission from enrollment authority to enroll credentials into device
202 Validate the request
203 Present device's digital certificate
204 Verify that device is true owner of the certificate
205 Present enrollment authority's digital certificate
206 Verify that enrollment authority is true owner of the certificate
207 Create a session key
208 Complete enrollment, encrypting with the session key

FIG. 2 is a flow chart illustrating the process for enrolling personal identity credentials into the personal identification device.

Figure 3:
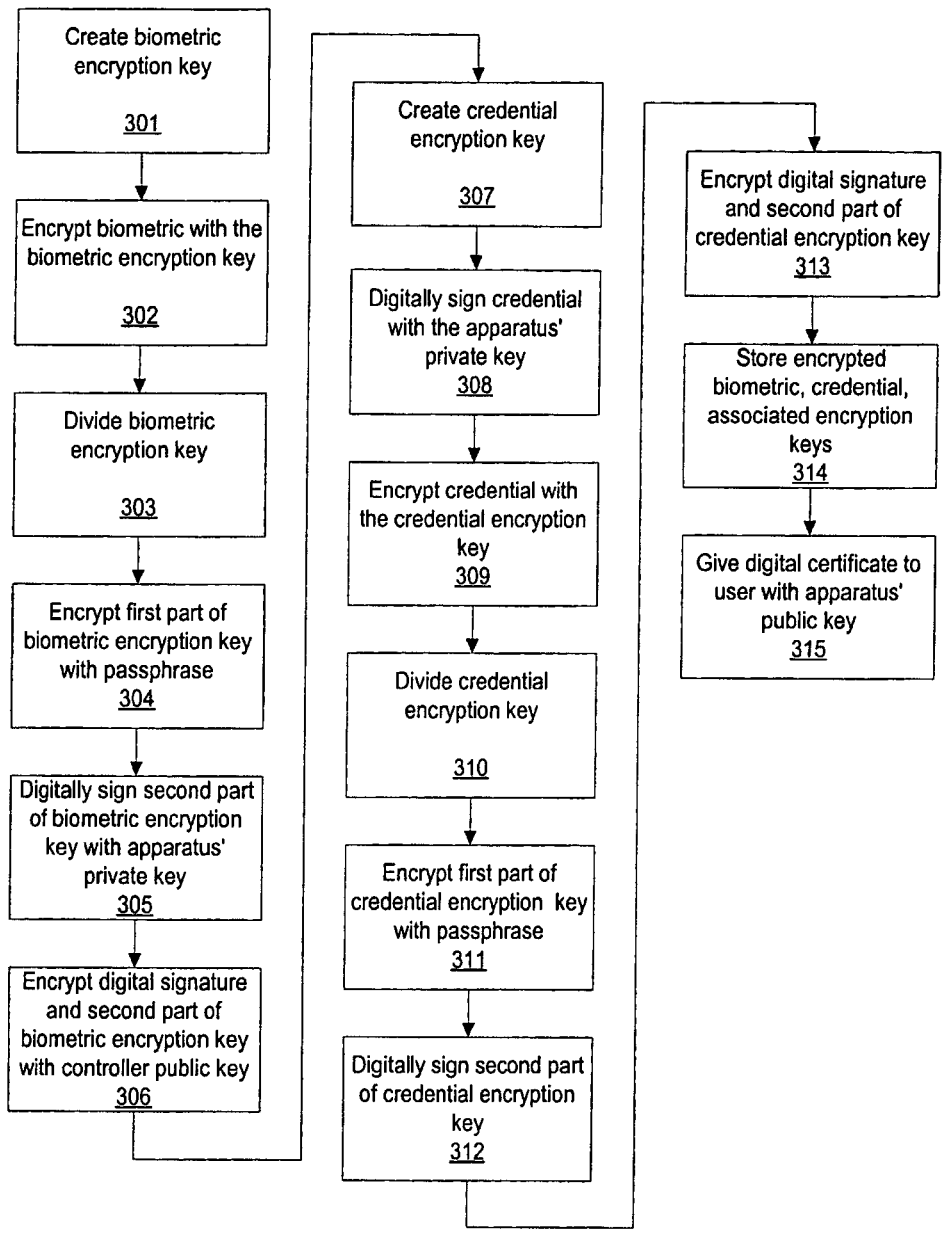
FIG. 3: Backup
301 Create symmetric biometric encryption and decryption key
302 Encrypt the biometric with the symmetric biometric encryption and decryption key
303 Divide the symmetric biometric encryption and decryption key into two parts
304 Encrypt first part with a passphrase
305 Digitally sign second part with primary device's private key
306 Encrypt digital signature and second part of symmetric biometric encryption and decryption key with the controller's public key
307 Create symmetric personal identity credential encryption and decryption key
308 Digitally sign personal identity credential with primary device's private key
309 Encrypt credential with symmetric personal identity credential encryption and decryption key
310 Divide symmetric personal identity credential encryption and decryption key
311 Encrypt first part of symmetric personal identity credential encryption and decryption key with passphrase
312 Digitally sign second part of symmetric personal identity credential encryption and decryption key with primary device's private key
313 Encrypt digital signature and second part of symmetric personal identity credential encryption and decryption key with controller's public key
314 Store the encrypted biometric, encrypted credentials, and encrypted symmetric biometric encryption and decryption key and symmetric personal identity credential encryption and decryption key in an electronic storage repository
315 Provide user with a digital certificate containing the primary device's public key

FIG. 3 is a flow chart illustrating the backup process for securely storing personal identity credentials for future restoration.

Figure 4:
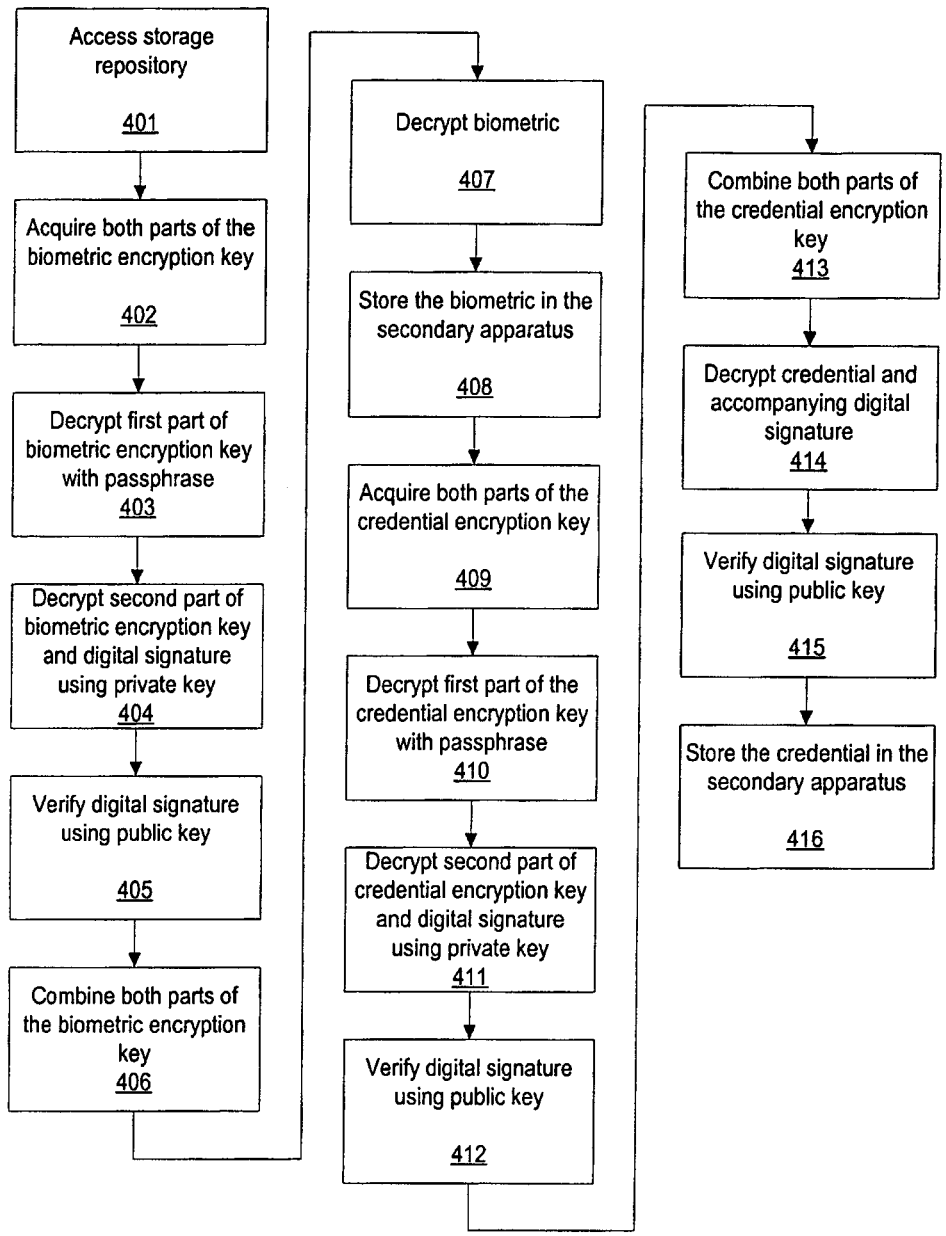
FIG. 4: Restoration
401 Access the electronic storage repository
402 Obtain both parts of the symmetric biometric encryption and decryption key
403 Decrypt the first part with a passphrase
404 Decrypt the second part and the digital signature with the controller's private key
405 Verify the digital signature using the primary device's public key
406 Combine both parts of the symmetric biometric encryption and decryption key
407 Decrypt the biometric
408 Store the biometric in the secondary device
409 Obtain both parts of the symmetric personal identity credential encryption and decryption key
410 Decrypt the first part with a passphrase
411 Decrypt the second part and the digital signature with the controller's private key
412 Verify the digital signature using the primary device's public key
413 Combine both parts of the symmetric personal identity credential encryption and decryption key
414 Decrypt the personal identity credential and the associated digital signature

FIG. 4 is a flow chart illustrating the restoration process.

Figure 5:
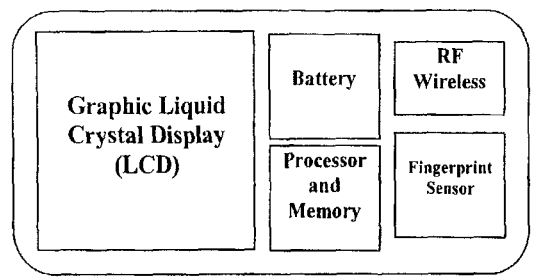

FIG. 5 illustrates components of a biometric personal identification device (BPID), according to an embodiment of the invention.

Figure 6:
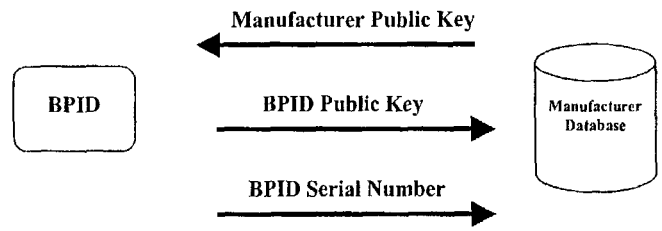

FIG. 6 is a system diagram illustrating transactions between the BPID of FIG. 5 and a manufacturer database, according to an embodiment of the invention.

Figure 7:
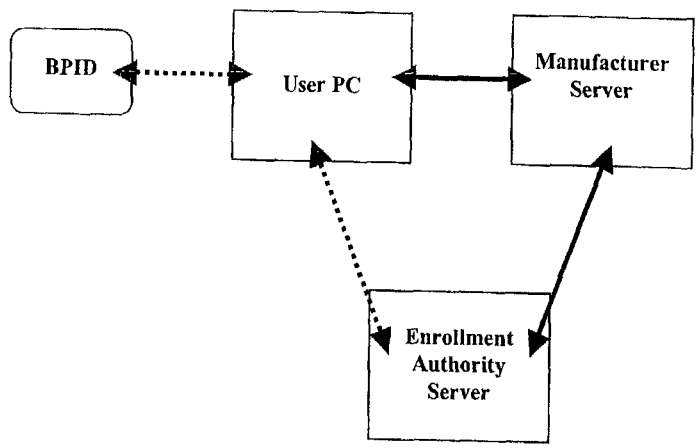

FIG. 7 is a system including the BPID of FIG. 5 illustrating communication channels for the enrollment process, according to an embodiment of the invention.

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention.

The invention disclosed herein provides a process for securely enrolling individuals into devices with means for personal identification via use of biometric authentication (hereafter referred to as 'personal identification devices'). Because these devices are intended for use as trusted authentication devices, it is imperative that all of the information stored within the device be placed there in such a manner that it cannot be altered without proper authorization. There are two participants in the enrollment process, the manufacturer of the personal identification device and an enrollment authority.

The enrollment process includes identifying the device post-manufacturing and enrolling personal identity credentials and an associated biometric into the personal identification device. Furthermore, the invention also discloses methods for creating secure backup and recovery processes, such that an individual may securely store the enrolled information in an electronic storage repository, such as a hard drive. If his personal identification device fails he can use the recovery process to transfer the stored, enrolled information to a new device.

The two participants in the enrollment process must be definitely and separately identified for proper enrollment. The first participant in the enrollment system is the manufacturer of the personal identification device. The manufacturer is responsible for maintaining a database of unique identifiers, such as serial numbers, for all of the devices that it produces. This enables it later to determine if it manufactured a particular device. The second party is an enrollment authority, which is responsible for investigating, authorizing and performing individuals' requests for enrollment into a personal identification device. This participant may be a Department of Motor Vehicles, a building security officer, or any other person or organization responsible for issuing personal identification devices.

Initial Enrollment

This enrollment system uses the PKI described above. Each manufacturer and enrollment authority is provided with at least one asymmetric key pair that can be used for identification and encryption. The key pairs may be self generated, but the public key for each must be placed in a digital certificate signed by a trusted authority. Additionally, the manufacturer may wish to sign digital certificates owned by the enrollment authority as means for guaranteeing its approval of the enrollment authority.

FIG. 1 demonstrates the post-manufacturing process that begins the enrollment process for a personal identification device. Immediately following manufacturing, each personal identification device receives a public key possessed by its manufacturer (step 101). In the preferred embodiment this key is received as part of a digital certificate. The personal identification device can use this public key to verify the digital signature on messages transmitted from the manufacturer and accept them as legitimate instructions. This step requires that the manufacturing process be secure and tamper-resistant; receiving a key other than a trusted manufacturer's would directly compromise future security verifications.

The personal identification device now generates an asymmetric key pair for itself (step 102). The public key and the device's unique identifier are sent to the manufacturer (step 103). The manufacturer, or other legitimate certificate authority, generates a digital certificate for the device (step 104). This is now sent back to the device, and can be signed by the manufacturer as a token of its legitimacy (step 105). The manufacturer keeps a record of the device's public key and its unique identifier for future reference (step 106). At this point all functionality within the personal identification device is disabled, such that it is in a state waiting for future enrollment (step 107).

As seen in FIG. 2, upon receipt of a personal identification device, an individual requests enrollment rights from an enrollment authority (step 201). This may require that the individual be physically present in a specified location, or may be performed remotely. The enrollment authority may establish all rules pertaining to the applicant verification process. The security and authenticity of the personal identification device is only as good as that of the verification process, so it is anticipated that these processes will be as stringent as required by the end application.

After approving the applicant, the enrollment authority receives the personal identification device's digital certificate (steps 202 and 203). The enrollment authority validates the digital certificate by prompting the device to encrypt a predetermined string with its private key (step 204). The enrollment authority now decrypts the encrypted string using the public key stored in the device' digital certificate, and verifies that the decrypted string matches the predetermined string. At this point the personal identification device will receive and verify the validity of the enrollment authority's digital certificate (steps 206 and 206). It performs the same prompt and verification process described above, and can also verify the manufacturer's signature on the certificate if one exists. After confirming the legitimacy of the enrollment authority, the personal identification device creates a session key, encrypts the session key and securely releases it to the enrollment authority (step 207). The personal identification device and the enrollment authority can now communicate freely using the session key (step 208). The biometric may be downloaded into the personal identification device along with the personal identity credentials, or may alternatively be sensed locally using the device and stored locally. The enrollment process, at this stage, is application-dependent and requires the establishment of requisite credentials, etc., which are not covered within the scope of this invention.

Restoration Processes

It may be necessary in some cases to provide a backup of at least one enrolled personal identity credential and biometric. The backup may be used in the event that the personal identification device fails, such that the individual may re-enroll a new personal identification device without undergoing the entire process described above; these devices are referred to as the 'primary personal identification device' and the 'secondary personal identification device,' respectively.

Backup

There are two distinct parts of the restoration process. The first part describes a method for archiving the enrolled personal identity credential, which allows an enrolled individual to securely store his personal identity credential and biometric to a user-accessible computer disk or other electronic storage repository. This data is only accessible with permission from a device manufacturer, an enrollment authority, or a recovery authority, as specified by the implementer of the system. In the primary embodiment, this system controller will be the manufacturer of the primary personal identification device. The second part of the restoration process describes a method for restoring the stored data to the secondary personal identification device.

As seen in FIG. 3, the primary personal identification device generates a symmetric biometric encryption and decryption key (step 301). This key is used for encrypting a digital representation of the enrolled biometric (step 302), which can be used to unlock the archived personal identity credential(s). After encryption of the biometric, the symmetric biometric encryption and decryption key is divided into two unique and distinct parts (step 303); the scheme of separation may be selected at the discretion of the system implementer. The first part of the symmetric biometric encryption and decryption key is encrypted with a user-selected passphrase (step 304). The second part of the symmetric biometric encryption and decryption key is signed by a private key possessed by the primary personal identification device (step 305), and is then encrypted with a public key owned by the system controller (step 306). As described above, in this embodiment the system controller is the primary personal identification device manufacturer. Using the manufacturer's public key forces an individual to request restoration privileges from the manufacturer during restoration, because the individual needs the manufacturer to decrypt the data with its private key. This is discussed in further detail below.

The primary personal identification device then generates a symmetric personal identity credential encryption and decryption key (step 307), which is used for encrypting at least one enrolled personal identity credential. The primary personal identification device first digitally signs the personal identity credential, using a private key (step 308), and then encrypts the personal identity credential and associated digital signature (step 309). Similarly to the scheme described above, the symmetric personal identity credential encryption and decryption key is divided (step 310) into two unique and distinct parts. The first part is encrypted with a user-selected passphrase (step 311), which may or may not be the same passphrase as used above. The second part is again signed by the device' private key (step 312) and encrypted with the manufacturer's public key (step 313).

All of the encrypted and/or signed data—the biometric, the symmetric biometric encryption and decryption key, the personal identity credential, and the symmetric personal identity credential encryption and decryption key—are now stored in an electronic storage repository (step 314). In typical embodiments the electronic storage repository could be a computer hard drive, floppy disk, or network drive. The primary personal identification device releases its digital certificate to the individual for future use of its public key (step 315).

Restoration

As seen in FIG. 4, when an individual receives a secondary personal identification device, and wishes to restore data from a primary personal identification device, he must access the electronic storage repository (step 401). The individual must first acquire the two encrypted and/or signed parts of the symmetric biometric encryption and decryption key (step 402). The secondary personal identification device decrypts the first part of the symmetric biometric encryption and decryption key with the user's passphrase (step 403). It then requests the system controller, the manufacturer of the primary personal identification device, to decrypt the second part of the symmetric biometric encryption and decryption key and the associated digital signature using its (the manufacturer's) private key (step 404). Once the data has been decrypted, the secondary personal identification device verifies the digital signature using a public key possessed by the primary personal identification device (step 405). The two parts of the symmetric biometric encryption and decryption key are now combined appropriately (step 406), and can be used to decrypt the biometric (step 407). The biometric is now stored in an appropriate location within the secondary personal identification device (step 408).

The individual now obtains the two encrypted and/or signed parts of the symmetric personal identity credential encryption and decryption key (step 409). Similarly to the process described above, the secondary personal identification device decrypts the first part of the symmetric personal identity credential encryption and decryption key using a user-selected passphrase (step 410). It now requests the system controller, the manufacturer of the primary personal identification device, to decrypt the second part of the symmetric personal identity credential encryption and decryption key and the accompanying digital signature using its private key (step 411). Again, the secondary personal identification device verifies the digital signature using a public key possessed by the primary personal identification device (step 412). The two parts of the key are reconstructed to form one key (step 413). The key is now used to decrypt the personal identity credential and the associated digital signature (step 414), and the signature is verified using a public key owned by the primary personal identification device (step 415). The decrypted personal identity credential can now be stored appropriately within the secondary personal identification device (step 416).

FIG. 5 illustrates the components of the BPID, according to an embodiment of the invention. As shown in FIG. 5, the components of the BPID include a processor, a memory, an RF wireless transceiver, a fingerprint sensor, a battery and a graphic liquid crystal display (LCD).

A BPID is a handheld electronic device that provides multi-factor authentication and allows its registered and/or enrolled owner to control the release and dissemination of stored information such as financial accounts, medical records, passwords, personal identification numbers, and other sensitive data and information. The device has tamper-resistant packaging with from factors ranging from credit card size to key fobs, and further includes a fingerprint scanner. Although those familiar in the art will recognize that this device's biometrics can be interchanged with another biometric technology, it can be observed that Russell's BPID patent application additionally includes a liquid crystal display (LCD) and buttons for user interaction, a wireless interface for communicating with other electronic devices, and a self-generated public key/private key pair for digitally signing data. The device has been developed so that the fingerprint cannot be physically or electronically removed or transmitted from the device, and information cannot be physically or electronically removed or transmitted from the device unless released by the owner of the authorizing fingerprint. All data and processing is performed securely.

The BPID can store and run multiple applications, allowing an individual to store a variety of personal information, although it is important to note that the applications are fully independent and cannot affect other applications' data. Many of these applications require the owner to transmit information to a terminal; for example, the BPID may wirelessly transmit financial account information to a cash register during an in-store purchase. In order to make the transaction secure, the BPID uses its private key to create a digital signature on all information that the individual chooses to release. Recipients of information from the BPID use the encrypted digital signature and a database of public keys to confirm that the information came from a specific device and that the information has not been altered. If it is desired by, e.g., a driver license verification application and/or other independent applications, the BPID can encrypt all transmitted data and information so that only the intended recipient can decode the information. The BPID places the control of personal and private information in the hands of the individual that owns the information and the organization that issues the device and/or creates device applications.

FIG. 6 is a system diagram illustrating transactions between the BPID of FIG. 5 and a manufacturer database, according to an embodiment of the invention. The BPID can receive from the manufacturer database the manufacturer public key. The BPID can generate an asymmetric key pair and release/send the BPID public key to the manufacturer database, who issues and signs a certificate for the BPID. The manufacturer database can download the certificate and public key of the manufacturer to the BPID. The BPID can receive from the manufacturer database the BPID serial number.

FIG. 7 is a system including the BPID of FIG. 5 illustrating communication channels for the enrollment process, according to an embodiment of the invention. The system includes the BPID, a user's personal computer (PC), a manufacturer server and an enrollment authority server. The user's PC can communicate with the BPID, the manufacturer server and the enrollment authority server. The enrollment authority server can communicate with the manufacturer server.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method, comprising:
receiving, by a personal identification device, an encrypted first section and a decrypted second section of a biometric encryption key, wherein the second section includes a digital signature, the second section having been decrypted by a server using a private key associated with the server and the digital signature having been decrypted by the server using a public key associated with a second personal identification device;
verifying, by the personal identification device, a validity of the digital signature using the public key associated with the second personal identification device;
decrypting, by the personal identification device, the encrypted first section of the biometric encryption key; and
combining, by the personal identification device, the first section of the biometric encryption key and the second section of the biometric encryption key to restore the biometric encryption key when the validity of the signature is verified.

2. The method of claim 1, further comprising:
before the receiving, sending the digital signature in encrypted form to the server.

3. The method of claim 1, wherein the biometric encryption key is a symmetric key.

4. The method of claim 1, wherein:
the private key associated with the server is the private key of a first asymmetric key pair, the first asymmetric key pair being associated with the server; and
the public key associated with the personal identification device is the public key of a second asymmetric key pair, the second asymmetric key pair being associated with the personal identification device.

5. The method of claim 1 wherein a server comprises one of: a manufacturer server, an enrollment authority server, a system controller, certificate authority, or other trusted authority.

6. A method, comprising:
decrypting, by a server, a section of a symmetric key containing a digital signature in encrypted form, using a private key associated with the server, the section of the symmetric key being less than an entirety of the symmetric key;
decrypting, by the server, the digital signature of the decrypted section of the symmetric key using a public key of a personal identification device to produce the decrypted section of the symmetric key including the decrypted digital signature; and
sending, by the server, the decrypted section of the symmetric key, including the decrypted digital signature, to a second personal identification device.

7. The method of claim 6, further comprising:
before the decrypting the digital signature in encrypted form, receiving the digital signature in encrypted form from the personal identification device.

8. The method of claim 6, further comprising:
before the decrypting the section of the symmetric key in encrypted form, receiving the section of the symmetric key in encrypted form from the personal identification device.

9. The method of claim 6, wherein the symmetric key is configured to decrypt biometric data in encrypted form.

10. The method of claim 6, wherein the sending the digital signature is performed such that the second personal identification device verifies a validity of the server when the digital signature in decrypted form is received by the second personal identification device.

11. The method of claim 6, wherein the symmetric key is a biometric encryption and decryption key, the section of the biometric encryption and decryption key is a first section of the biometric encryption and decryption key, the biometric encryption and decryption key having been split into the first section and a second section after encryption of a biometric at the personal identification device.

12. A method, comprising:
decrypting, by a server, a section of a first symmetric key in encrypted form containing a digital signature, the decrypting based on a private key of the server, to produce the section of the first symmetric key in decrypted form, the section of the first symmetric key in decrypted form being less than an entirety of the first symmetric key, the private key being associated with a server;
after the decrypting the section of the first symmetric key in encrypted form, sending the section of the first symmetric key in decrypted form, and sending the remainder of the entirety of the first symmetric key in encrypted form, to a personal identification device, the first symmetric key associated with biometric data for the personal identification device;

decrypting, by a server, a section of a second symmetric key in encrypted form containing a digital signature, the decrypting based on the private key of the server, to produce the section of the second symmetric key in decrypted form, the section of the second symmetric key in decrypted form being less than an entirety of the second symmetric key; and after the decrypting the section of the second symmetric key in encrypted form, sending the section of the second symmetric key in decrypted form, and the remainder of the entirety of the second symmetric key in encrypted form, to the personal identification device.

13. The method of claim 12, further comprising:
before the decrypting the section of the first symmetric key in encrypted form, receiving the section of the first symmetric key in encrypted form from the personal identification device.

14. The method of claim 12, further comprising:
before the decrypting the section of the second symmetric key in encrypted form, receiving the section of the second symmetric key in encrypted form from the personal identification device.

15. The method of claim 12, further comprising:
decrypting a digital signature in encrypted form associated with the section of the first symmetric key based on the private key of the server to produce the digital signature in decrypted form associated with the section of the first symmetric key, the sending the section of the first symmetric key in decrypted form to the personal identification device including sending the digital signature in decrypted form to the second personal identification device such that the second personal identification device verifies a validity of the server when the digital signature is received by the personal identification device.

16. The method of claim 12, wherein the first symmetric key is configured to decrypt the biometric data in encrypted form.

17. The method of claim 12, wherein the second symmetric key is configured to decrypt personal identity credential in encrypted form for the personal identification device.

18. The method of claim 12, wherein the personal identification device is a first personal identification device, the biometric data previously being stored on a second personal identification device.

19. The method of claim 12, wherein the decrypting the section of the first symmetric key in encrypted form is performed before the decrypting the section of the second symmetric key in encrypted form.

20. The method of claim 12, wherein the section of the second symmetric key is a first section of the second symmetric key, the sending the first section of the second symmetric key is performed such that the personal identification device combines the first section of the second symmetric key with a second section of the second symmetric key to restore the second symmetric key associated with the personal identity credential for the personal identification device.

21. A non-transitory computer readable medium programmed with executable instructions that, when executed by a processing system, perform a method, comprising:

receiving, by a personal identification device, an encrypted first section and a decrypted second section of a biometric encryption key, wherein the second section includes a digital signature, the second section having been decrypted by a server using a private key associated with the server and the digital signature having been decrypted by the server using a public key associated with a second personal identification device;

verifying, by the personal identification device, a validity of the digital signature using the public key associated with the second personal identification device;

decrypting, by the personal identification device, the encrypted first section of the biometric encryption key; and combining, by the personal identification device, the first section of the biometric encryption key and the second section of the biometric encryption key to restore the biometric encryption key when the validity of the signature is verified.

22. A non-transitory computer readable medium programmed with executable instructions that, when executed by a processing system, perform a method, comprising:

decrypting, by a server, a section of a symmetric key containing a digital signature in encrypted form, using a private key associated with the server, the section of the symmetric key being less than an entirety of the symmetric key;

decrypting, by the server, the digital signature of the decrypted section of the symmetric key using a public key of a personal identification device to produce the decrypted section of the symmetric key including the decrypted digital signature; and sending, by the server, the decrypted section of the symmetric key, including the decrypted digital signature, to a second personal identification device.

23. A non-transitory computer readable medium programmed with executable instructions that, when executed by a processing system, perform a method, comprising:

decrypting, by a server, a section of a first symmetric key in encrypted form containing a digital signature, the decrypting based on a private key of the server, to produce the section of the first symmetric key in decrypted form, the section of the first symmetric key in decrypted form being less than an entirety of the first symmetric key, the private key being associated with a server;

after the decrypting the section of the first symmetric key in encrypted form, sending the section of the first symmetric key in decrypted form, and sending the remainder of the entirety of the first symmetric key in encrypted form, to a personal identification device, the first symmetric key associated with biometric data for the personal identification device;

decrypting, by a server, a section of a second symmetric key in encrypted form containing a digital signature, the decrypting based on the private key of the server, to produce the section of the second symmetric key in decrypted form, the section of the second symmetric key in decrypted form being less than an entirety of the second symmetric key; and after the decrypting the section of the second symmetric key in encrypted form, sending the section of the second symmetric key in decrypted form, and the remainder of the entirety of the second symmetric key in encrypted form, to the personal identification device.

* * * * *